United States Patent [19]

Nicks

[11] Patent Number: 5,164,449

[45] Date of Patent: Nov. 17, 1992

[54] THIXOTROPIC BINDER SYSTEM FOR THIXOTROPIC COATING COMPOSITIONS

[75] Inventor: Peter F. Nicks, Maidenhead, England

[73] Assignee: Imperial Chemical Industries PLC, London, England

[21] Appl. No.: 601,422

[22] Filed: Oct. 23, 1990

[30] Foreign Application Priority Data

Oct. 26, 1989 [GB] United Kingdom ............ 8924125

[51] Int. Cl.$^5$ .............................................. C08L 75/02
[52] U.S. Cl. ................................................... 525/131
[58] Field of Search ........................................ 525/131

[56] References Cited

U.S. PATENT DOCUMENTS

| | | | |
|---|---|---|---|
| 4,165,329 | 8/1979 | Dreher et al. | 260/404.5 |
| 4,311,622 | 1/1982 | Buter | 260/18 EP |
| 4,677,028 | 6/1987 | Heeringa et al. | 524/507 |
| 4,882,408 | 11/1989 | Blum | 528/49 |

FOREIGN PATENT DOCUMENTS

| | | |
|---|---|---|
| 0198519 | 2/1986 | European Pat. Off. |
| 0192304 | 8/1986 | European Pat. Off. |
| 0261863 | 3/1988 | European Pat. Off. |
| 0300388 | 1/1989 | European Pat. Off. |
| 2360019 | 6/1974 | Fed. Rep. of Germany |
| 2209831 | 7/1974 | France |
| 1406553 | 9/1975 | United Kingdom |
| 1454388 | 11/1976 | United Kingdom |
| 1454414 | 11/1976 | United Kingdom |
| 1586508 | 3/1981 | United Kingdom |

*Primary Examiner*—James J. Seidleck
*Assistant Examiner*—Thomas Hamilton, III
*Attorney, Agent, or Firm*—Thomas M. Schmitz

[57] ABSTRACT

A film-forming thixotropic binder system for imparting sag resistance to coating compositions comprising the product obtained by reacting an isocyanate preferably having a molecular weight of at least 400 and comprising more than two isocyanate groups (preferably an isocyanurate trimer obtained from di-isocyanates) with a polyamine and optionally a monoamine in the presence of a film-forming carboxylic acid copolymer having an acid value of at least 25 mg KOH/g copolymer. The binder composition may be neutralized by alkali to produce a salt soluble in an aqueous coating composition. Also detailed processes for making the binder system.

16 Claims, No Drawings

THIXOTROPIC BINDER SYSTEM FOR THIXOTROPIC COATING COMPOSITIONS

This invention relates to a film-forming thixotropic binder system suitable for use in making (preferably aqueous) thixotropic coating compositions, especially coating compositions suitable for use at ambient temperatures.

Coatings freshly applied to vertical surfaces show a tendency to flow under gravity whilst the coatings are still wet. This tendency is known as "sag". Sag can be reduced by adding sag control agents such as particulate clays to the coating composition. However, such particles are incompatible with the film-forming systems of coating compositions and so the presence in the systems of such particles reduces the ability of the coating composition to spread evenly during application with the result that brush marks or spray mottle may not disappear. Particles also affect the appearance of the dried coating and in particular they detract from a gloss finish.

Attempts have also been made to reduce sag by using certain polyureas as sag control agents. The polyureas may be made by co-reacting isocyanate with polyamine optionally in the presence of a film-forming binder copolymer. However, it has been found that di-isocyanates create toxic hazards and so to minimise these, it is necessary to use isocyanates containing more than two isocyanate groups and preferably having a molecular weight of over 400 whereupon the probility is that the sag control agents obtained will be solid. For example, European Patent Application EP-A-0 192 304 discloses a film-forming binder system suitable for use in making a thixotropic coating composition comprising various non-acid binder copolymers and a polyurea sag control agent obtained by co-reacting polyamines with isocyanate trimers containing three isocyanate groups and having a molecular weight of over 400. The presence of three isocyanate groups and the high molecular weight of the isocyanates minimises toxic hazards but the sag control agent obtained is solid having a particle size of at least 10 nm and so it will detract from the appearance of the finish (especially a gloss finish) of a coating applied at ambient temperatures.

An object of the present invention is to provide a new binder system which can be used without undue toxic hazards to make a (preferably aqueous) thixotropic coating composition having good sag resistance without the need to contain sag-controlling solid particles, especially particles which would detract from the appearance of a dried (especially gloss) coating which has been applied at ambient temperatures.

Accordingly this invention provides a film-forming thixotropic binder system suitable for use in making a (preferably aqueous) thixotropic coating composition (especially a coating composition suitable for use at ambient temperatures), the system comprising a co-reaction product obtainable by co-reacting a) at least one isocyanate compound comprising more than two isocyanate groups and preferably having a molecular weight of at least 400 (and usually not exceeding 2000)

b) at least one primary or secondary polyamine (i.e. an amine containing at least two amino groups) and optionally c) at least one primary or secondary monoamine which co-reaction is performed in the presence of from 80 to 99 wt % of a film-forming copolymer (where the weight percentage is based on the combined weights of the copolymer, the isocyanate compound, the polyamine and the monoamine if any) and wherein d) the copolymer is a carboxylic acid copolymer which prior to the co-reaction comprises carboxylic acid groups in an amount sufficient to give the copolymer an acid value of at least 25 (but preferably not more than 60) mg KOH/g copolymer, e) the ratio of the number of isocyanate groups to all amine groups (i.e. both polyamine and monoamine if any) is greater than 1:1 and conveniently is 1.05 to 1.25:1 and preferably f) from 10 to 90% of the amine groups are provided by monoamine.

Co-reaction may be brought about by introducing the co-reactants and the carboxylic acid copolymer into a suitably dry organic solvent. Preferably the solvent should be dry to the extent that it contains less than 5 wt % of water, for example commercially available 1-methoxy-2-hydroxy-propane hereinafter referred to as MHP. The isocyanate compound and the polyamine co-react together to form a polyurea moiety probably as follows:

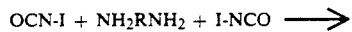

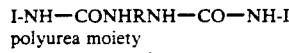

polyurea moiety
I is part of the isocyanate compound.

It is not known how many isocyanate molecules and polyamine molecules co-react to form the polyurea moiety nor is it known for certain if or how the polyurea moiety bonds to the carboxylic acid copolymer but it is suspected that some such bonding is essential for the avoidance of particles of precipitated polyurea. Although a reaction between carboxylic acid and isocyanate would ordinarily be expected to be slow, a significant evolution of carbon dioxide and a fall in the acid value of the copolymer accompany the co-reaction and this suggests the possibility of a reaction between isocyanate groups and the carboxylic acid groups of the copolymer which is fast enough to compete with the amino/isocyanate reaction. The reaction probably proceeds as follows:

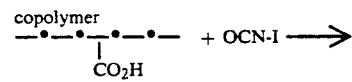

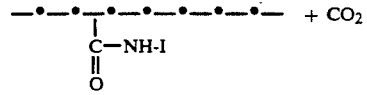

It is now believed that the above reaction is catalysed by the presence of adjacent carboxylic acid groups on the copolymer but not taking part in the reaction.

If the carboxylic acid copolymer also contains hydroxyl groups, for example hydroxyl groups introduced by copolymerised hydroxyalkyl ester or by condensation with allyl glycidyl ether, then some of the isocyanate groups may possibly bond to the carboxylic acid copolymer via at least some of the hydroxyl groups as follows:

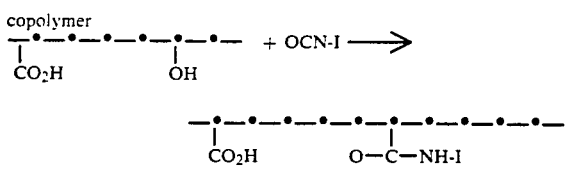

It is now thought quite likely that such presumed bonding could assist the avoidance of precipitation during long term storage, especially storage for periods of over 12 months. For this reason it could in some cases be useful to have additional bonding via hydroxyl groups and so it may be worthwhile introducing extra hydroxyl groups into the copolymer specifically for this purpose. Preferably the copolymer (before co-reaction) comprises from 2 to 6 (most preferably 3 to 5) wt % of hydroxyl groups.

The isocyanate compound preferably comprises three isocyanate groups. In practice such compounds are available as commercial products which have been previously made by a condensation of di-isocyanates. For example hexamethylene di-isocyanate condenses in the presence of water to give carbon dioxide and the following trimerisate:

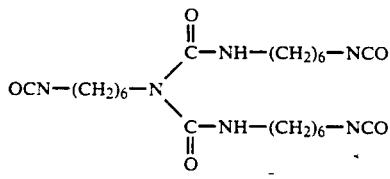

Condensations of this type are seldom totally efficient and so the commercially available product will generally also contain some dimerisate. In such cases it is preferred to use a product in which the average number of isocyanate groups per molecule is at least 2.5. However the most preferred isocyanate compounds are isocyanurate trimers containing three isocyanate groups. These may be obtained by for example condensing di-isocyanate groups containing 6 to 20 carbon atoms, particularly polymethylene di-isocyanates (especially hexamethylene di-isocyanate) which preferably contain from 4 to 8 methylene groups. Of these preferred isocyanurate trimers, the most preferred is a proprietary heterocyclic material sold as "Desmodur" N3300 available from Bayer AG of Leverkusen in West Germany. "Desmodur" N3300 is believed to consist mainly of the trimer of hexamethylene di-isocyanate and the isocyanurate trimers are believed to have structures which at least approximate to the following:

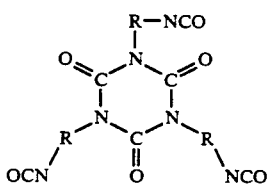

where R is hexamethylene divalent linking moiety.

The use of isocyanate compounds containing more than two isocyanate groups might lead to excessive chemical crosslinking leading to the creation of solid particles even when there is interaction with the carboxylic acid groups of the copolymer. Where this problem arises, it is preferred to include monoamine in the co-reactants. The monoamine reacts rapidly with a proportion of the isocyanate groups in the trimer to prevent the formation of the extensive chemical crosslinking. The monoamine may be any monoamine which can serve this purpose, for example alkylamines or hydroxyalkylamines preferably containing 2 to 6 carbon atoms, aromatic amines such as aniline, aralkyl amines such as benzylamine or heterocyclic amines such as piperidine. It is preferred to use secondary monoamines and in particular heterocyclic secondary monoamines such as morpholine which is:

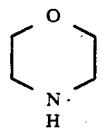

The monoamine must be introduced before the polyamine if the amines are added to isocyanate compound already present in the co-reaction vessel. The co-reaction probably proceeds as follows:

$$OCN-I + R-NH_2 \rightarrow I-NH-CO-NHR$$

The polyamine may be any polyamine which can co-react with the isocyanate compound to form a polyurea moiety although diamines are preferred because they lead to simpler macromolecules. The preferred diamines are ethylene diamine and hexamethylene diamine.

The film-forming carboxylic acid copolymer generally comprises copolymerised non-acid monomers and copolymerised acid and/or acid anhydride monomers. Examples of acid or anhydride monomers are acrylic, methacrylic, crotonic, fumaric or itaconic acids or maleic anhydride all of which can undergo free radical initiated addition polymerisation. Acrylic or methacrylic acids are preferred. The acids or anhydrides should confer on the copolymer and acid value of at least 25 (preferably at least 30) mg KOH/g copolymer for if the acid value falls below 25, a polyurea is obtained which is very likely to be particulate when formed or to precipitate as particles during storage over a period of up to 12 months. It is preferred that the acid value should not exceed 60 for if it does, then (for a given amount of polyurea) an unacceptable loss of thixotropy occurs as the acid value with increases beyond 60. Where the binder system is to be used in an aqueous composition it is preferred that after co-reaction, the copolymer should retain enough carboxylic acid groups to have an acid value of at least 25 and preferably from 30 to 50 mg KOH/g copolymer where "g copolymer" refers to the weight of the copolymer present before the co-reaction.

The non-acid monomers are usually hydrophobic unsaturated monomers which have solubilities of less than 6 wt % in pure water. Preferred hydrophobic non-acid monomers are of the type conventionally used in making resins for the paint trade. The carboxylic acid copolymer may comprise just one such non-acid monomer such as methyl, ethyl or butyl acrylate but in general it has been found easier to obtain a better balance of properties when a combination of at least two non-acid monomers is used, one of which monomers would give a homopolymer of high glass transition temperature (Tg), for example Tg above 30° C. and one which would give a homopolymer of low Tg, for example Tg below −10° C. Tg is calculated or measured according to the procedures hereinafter described. Examples of non-acid monomers which give homopolymers of high Tg include methyl methacrylate, vinyl acetate and styrene. Examples of non-acid monomers which give homopolymers of low Tg include ethyl acrylate, 2-ethylhexyl acrylate, methyl acrylate, butyl acrylate and the material commercially available from the Shell chemical Company under the trade name "Vinyl Versatate" which is believed to be the vinyl ester of a mixture of branched chain acids which acids contain around 10 carbon atoms. 2-ethylhexyl acrylate has the advantage of not smelling too strongly when present in residual trace amounts in the final coating composition. The weight average molecular weight of the copolymer before co-reaction is preferably from 10 000 to 100 000 and most preferably from 15 000 to 75 000.

A minor proportion of the non-acid monomers may be hydrophilic especially if it is required to introduce additional hydroxyl groups into the copolymer and/or to adjust the solubility of the final system in water. Examples of useful hydrophilic non-acid monomers include hydroxy ethyl acrylates, methacrylamide and the alkoxy polyethylene glycol methacrylates of various molecular weights. Usually a hydrophilic non-acid monomer will have a solubility in pure water of more than 6 wt % and amount to less than 10 wt % of the copolymer.

For some purposes, it may be useful to introduce autoxidisable moieties into the carboxylic acid copolymer so that the copolymers can crosslink and confer water-resistance on the dried coating. A convenient way to do this is to condense enough of the carboxylic moieties of the copolymer with allyl glycidyl ether or its methallyl analogue to produce a partial ester comprising preferably from 15 to 38 wt% of moieties derived from the ether. Allyl glycidyl ether is

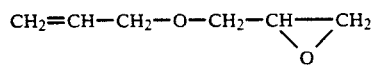

and it condenses to give the following partial ester

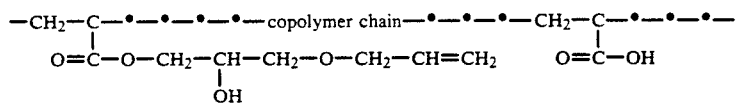

from which it will be seen that the esterifying group contains an autoxidisable moiety and a hydroxyl group. The proportion of carboxylic acid groups in the copolymer before the condensation should be sufficient to ensure that after condensation, the copolymer has the required acid value of at least 25 to 60 mg KOH/g partially esterified copolymer. Autoxidisable coating compositions should contain autoxidation catalysts such as cobalt octoate or naphthenate or the like. Examples of potentially useful alternatives to allyl glycidyl ether are represented by the general formula

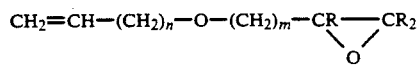

where R is H or $C_1$ to $C_8$ alkyl and n and m are independantly 1 or 2.

In order to make an aqueous thixotropic coating composition, the thixotropic binder system is accommodated in aqueous solvent comprising water and from 0 to 70 wt % organic cosolvent (the percentage being based on the combined weights of water and cosolvent). The cosolvent (if present) should plasticise the thixotropic binder system and/or otherwise increase its compatibility with water. The cosolvent preferably has a boiling point of from 75° to 200° C. at 1 bar. Examples of useful cosolvents include alcohols, glycols, ester alcohols, ether alcohols and the esters of ether alcohols for example: n-butanol, 2-pentanol, ethylene glycol, benzyl alcohol, 2,2,4 trimethylpentane, 1,3 diolmonoisobutyrate, ethylene glycol, and its monopropyl, butyl and hexyl ethers, propylene glycol and its monomethyl, ethyl, propyl and butyl ethers, diethylene glycol, dipropylene glycol, dipropylene glycol methyl ether, diethylene glycol ethyl ether, ethylene glycol monomethyl ether and most preferably propylene glycol monomethyl ether.

Organic cosolvents are environmentally unwelcome, so it is preferred to choose a binder system in which the carboxylic acid copolymer prior to the co-reaction has an acid value of at least 25 gKOH/g copolymer and to convert the binder system at least in part to a salt by reacting it with aqueous alkali to neutralise at least some of the carboxylic acid groups in the copolymer. This minimises (and may even eliminate) the need for cosolvent. The alkali may be nitrogen-containing such as ammonia or an amine or it may comprise a metal ion, especially a Group 1 metal ion such as lithium, sodium or potassium. Nitrogen-containing bases have the advantage of giving coating compositions which dry (assuming the Tg of the copolymer is above ambient temperature and especially above 30° C.) to provide a reasonably water-resistant coating when most of the nitrogen-containing cations have been lost by volatilisation. In contrast, neutralisation by Group 1 metal ions gives coating compositions which provide good temporary protective coatings easily removable by washing with alkaline water. Temporary protective coatings are frequently used to provide metal surfaces with temporary and easily removable protection against abrasion during the period of time between the fabrication of the surface and its subsequent painting with a permanent coating. If however water-resistance is required, binder systems comprising metal ions should also comprise autoxidisable moieties which can crosslink to confer water-resistance on the dried coating. Coatings obtained from compositions neutralised by metal ions have been found to show improved resistance to discolouration on ageing.

When fully neutralised binder system is accommodated in water containing a small amount of cosolvent, the binder system appears to be fully dissolved. However the salt so formed generally does not form a perfect solution because its solutions are usually not fully transparent. Instead they scatter light to a small extent and may appear hazy when the coating composition contains little or no organic cosolvent. In practice, the salt is preferably such that where the copolymer is fully neutralised by sodium cations, the salt produced is soluble at least to the extent that a solution comprising 25 wt % anionic moieties of the salt and 75 wt % of a mixture of equal weights of water and 1-methoxy-2-hydroxy propane (MHP) (where the percentage is based on the combined weights of anionic moieties of the salt, water and MHP) appears clear to the unaided eye after the solution has stood for 48 hours at 20° C.

Performance of the co-reaction at temperatures above 55° C. has often decreased the degree of thixotropy achievable and for this reason it has been preferred to co-react at a temperature not exceeding 55° C. It has now been discovered that a partial neutralisation of the carboxylic acid copolymer with one or more of the alkalis before co-reaction is performed allows the co-reaction to be performed at higher temperatures, for example temperatures at least as high as 90° C. to 125° C. Not more than 90% of the carboxylic acid groups should be neutralised before co-reaction otherwise the risk of precipitation of the binder system on storage becomes serious. Not more than 40% neutralisation before co-reaction is preferred because it is suspected that increased neutralisation inhibits the presumed catalysis of the presumed reaction between isocyanate and the carboxylic acid groups of the copolymer. Accordingly this invention also provides a process wherein from 20 to 90% (and preferably not more than 40%) of the carboxylic acid moieties of the carboxylic acid copolymer are neutralised by alkali before the co-reaction is started in order to extend the range of co-reaction temperature. This increased freedom to use the higher co-reaction temperatures is possibly only obtained at the cost of less of the supposed bonding between isocyanate and the carboxylic acid or any hydroxyl groups of the copolymer. Therefore if it is impossible to tolerate even a small risk of the unwanted precipitation of particles during long term storage, then any neutralisation of the copolymer should be postponed until after the co-reaction.

The film-forming thixotropic binder systems are particularly useful in making aqueous temporary protective coatings, paints, varnishes and woodstains which dry in air at ambient temperatures. They may provide the sole binding material or they may be used with other film-forming binder systems. In particular they may be mixed with aqueous so-called solutions of film-forming polymers or with aqueous dispersions of particulate film-forming polymers which form binding films by coalescence of the particles. The thixotropic binder systems are especially useful in making water-based gloss paints, that is to say paints which dry to produce a coating having a specular gloss at an angle of 60° of at least 30% (usually at least 65%) where specular gloss at 60° is measured according to ASTM Test D523 using light reflected at an angle of 60° to the normal to the surface of the paint. Often a gloss of at least 70% at 20° reflectance can be achieved.

The coating compositions may also contain components conventionally used in making for example temporary protective coatings, paints, varnishes and woodstains such as conventional components including dyes, thickeners, fungicides, anti-skinning agents, flow improvers and drying agents and especially solid ingredients such as pigments and extenders. Generally the coating composition will comprise from 20 to 60 wt % of binder material based on the total weight of the non-volatile components of the compostion as determined according to the procedure of ASTM Test D 1644-88.

The inclusion of thixotropic binder systems in aqueous coating compositions creates a highly viscous or gelled structure which is difficult to handle during the formulation of the final composition. Usually therefore the system has to be stored and pumped at elevated temperatures, that is to say above 40° C. It has now been discovered that the development of the thixotropic character of the binder systems of this invention can be retarded for at least 4 hours and possibly as long as 8 hours by forming the binder system under agitated (for example stirred) conditions. This allows time for the solid ingredients of the composition to be mixed thoroughly with the binder system before the onset of the full thixotropic nature of the binder system. It also facilitates the filling of the final composition into cans or other containers.

Accordingly this invention also provides a process for making a coating composition comprising a binder system according to this invention and solid ingredient which comprises performing the co-reaction whilst the co-reactants are subject to agitation and introducing solid ingredient to the co-reactants or binder system not later than 8 hours from the start of the co-reaction.

Agitation should be sufficiently vigorous to ensure that virtually all (at least 95 vol %) of the ingredients of the composition are in motion at all times from the addition of the first co-reactant until just before removal of the final composition from the vessel in which co-reaction and mixing has been performed. Usually, solid inorganic ingredients such as pigments or extenders are added to the vessel as a pre-formed slurry known as a "millbase". The sequence of addition should be such that the polyamine is never introduced to the trimer in advance of the monoamine and in practice this means that the monoamine is added first or a mixture of monoamine and polyamine is used. Where optimum presumed bonding of isocyanate via a carboxylic acid or hydroxyl group is sought, any neutralisation of the carboxylic acid copolymer is preferably postponed until after the co-reaction has occurred unless the co-reaction needs to be performed at high temperatures. Apart from the above considerations, the sequence of addition of the ingredients is not critical. Co-reaction and mixing are conveniently performed at ambient temperature that is to say temperatures of up to 40° C.

Determination of Tg:

For the purposes of this specification, the Tg of a homopolymer is taken to be that shown in Table 14 in the article "Concepts Involved in Designing Acrylic copolymers in Solution" by D H Klein published in the "Journal of Paint Technology" Volume 42 No.545 of June 1970, see pages 335 to 351, the contents of which are herein incorporated by reference or if the homopolymer is one which is not present in Klein's Table 14, then its Tg is taken from pages 143 to 192 (the contents of which are herein incorporated by reference) of Part III of the second edition of the "Polymer Handbook" edited by J Brandrup and E H Immergut and published in 1975 by John Wiley & Sons of New York or if the homopolymer is not present in Klein's Table 14 and the "Polymer Handbook", then its Tg is determined by compensation differential scanning calorimetry as described on pages 4 to 9 of the book "thermal Characteristics of Polymeric Materials" edited by E A Turi and published in 1981 by Academic Press Inc. (London) Ltd, the contents of which pages are herein incorporated by reference. The calorimetry should be performed on samples which have seen heated isothermally at 100° C. for 15 minutes. It should be mentioned however, the measurements of Tg are seldom accurate to more than +/−5° C.

The Tg of a copolymer is then calculated using the Fox equation employing the values for homopolymer Tg obtained as above.

Cone and Plate Viscosity:

The Cone and Plate viscosities referred to in some of the Examples were measured at 25° C. according to the technique described by C J H Monk in the "Journal of the Oil and Colour Chemists Association" 1966 Volume 49 pages 543 to 550, the contents of which are herein incoporated by reference.

Epoxide Value Measurement Technique:

The epoxide value of a grafted copolymer is determined by adding crystal violet indicator to a sample of the copolymer dissolved in glacial acetic acid and then titrating the solution against 0.1M perchloric acid until the indicator turns from violet to yellow. Epoxide value is expressed as:

$$\frac{5.61 \times V}{W}$$

where V is the volume of perchloric acid used and W is the weight of grafted copolymer originally in the solution.

The invention is further illustrated by the following Examples of which Examples A to G are comparative. In the Examples, the term "parts" is used to denote "parts by weight", the procedure of ASTM Test D 1210-79 is used to determine whether or not the binder systems contain particles and the initials "MHP" denote 1-methoxy-2-hydroxy propane.

EXAMPLE 1

Preparation of a Binder System:

A film-forming carboxylic acid copolymer was made by copolymerising acrylic acid, methyl methacrylate and ethyl acrylate. More particularly, 6.4 parts (by weight) acrylic acid, 49.3 parts methyl methacrylate and 44.3 parts ethyl acrylate together with 5 parts of a free radical initiator (which was tertiary butyl peroxy 2-ethyl hexanoate) were added to 66.7 parts of 1-methoxy-2-hydroxy propane (MHP) refluxing at 120° C. over a period of 3 hours. Refluxing was continued for a further 90 minutes and during the last 60 minutes a further 1 part of the initiator was added to ensure optimum completion of the copolymerisation. Finally the reaction mixture was allowed to cool to room temperature and was found to contain 62 wt % of a copolymer which had an acid value of 45.6 mg KOH/g copolymer and a Tg of 36° C. as calculated using the Fox equation.

The carboxylic acid copolymer was converted to a film-forming thixotropic binder system by taking 1000 parts of the reaction mixture obtained above and heating it in a stirred vessel to a co-reaction temperature of 50° C. Next 61 parts of an isocyanurate trimer which was "Desmodur" N3300 were added to the vessel followed immediately by 11.9 parts of morpholine in 10 parts of MHP. Stirring was continued and ten minutes later 4.2 parts ethylene diamine in 10 parts MHP were added followed by a further 10 minutes of stirring and finally the mixture was cooled to room temperature.

The ratio of isocyanate to amine moieties used was therefore 1.14:1

A film-forming thixotropic binder system was obtained which was a clear gel containing no solid particulate material when examined by the procedure of ASTM Test D 1210-79. The binder system contained 58.5 wt % of non-volatile material, had an acid value of 42 mg KOH/g of non-volatile material and contained 10 wt % of polyurea moieties (the percentage being based on the weight of the non-volatile material).

The binder system could be neutralised by aqueous sodium hydroxide and dissolved in water to produce a thixotropic aqueous temporary protective coating composition which had good sag resistance when applied to a vertical surface.

EXAMPLE 2

Preparation of an Alternative Binder System:

A film-forming carboxylic acid copolymer was made according to the procedure of Example 1 except that 5 parts acrylic acid, 50 parts methyl methacrylate and 45 parts ethyl acrylate were used and the copolymer obtained had an acid value of 35.7 mg KOH/g copolymer and a Tg of 35° C. as calculated using the Fox equation. The copolymer was converted to a binder system using the procedure of Example 1 except that the parts of trimer, morpholine and ethylene diamine used were 34.6, 6.6 and 2.4 respectively and the trimer was "Desmodur" N3300. The ratio of isocyanate to amine moieties was therefore 1.14 to 1 again.

A film-forming thixotropic binder system was obtained which was a clear gel containing no particles when examined by the procedure of ASTM Test D 1210-79. The system contained 58.5 wt % non-volatile material, had an acid value of 32.5 mg KOH/g non-volatile material and contained 6 wt % polyurea moieties (the percentage being based on the weight of non-volatile material).

The binder system could be neutralised by aqueous sodium hydroxide and dissolved in water to produce a thixotropic aqueous temporary protective coating composition which had a good sag resistance when applied to a vertical surface.

EXAMPLES 3 TO 6 AND COMPARATIVE EXAMPLES A AND B

Preparation of Autoxidisable Binder Systems from Varying Monoamine/Polyamine Ratios.

A film-forming carboxylic acid copolymer was made according to the procedure of Example 1 except that the comonomers used were 9.8 parts methacrylic acid, 30.3 parts methyl methacrylate and 9.5 parts butyl acrylate. The copolymer obtained had a preliminary acid value of 207 mg KOH/g copolymer.

The copolymer was made autoxidisable by partially esterifying it with allyl glycidyl ether. More particularly the reaction mixture obtained above was re-heated to 120° C. and then 6.6 parts of allyl glycidyl ether were stirred in over a period of 1 hour together with 1.5 parts of an oxirane ring opening catalyst which was benzyl trimethyl ammonium hydroxide. The esterification reaction was continued until the mixture had an epoxide value of below 5 mg KOH. Partial esterification was found to have reduced the acid value of the copolymer to 33.8 mg KOH/g copolymer.

The autoxidisable copolymer was converted to a binder system according to the general procedure of Example 1 except that the parts of "Desmodur" N 3300 trimer, morpholine and ethylene diamine used are specified in Table 1. The isocyanate/amine moiety ratio was again 1.14:1 and the system contained 6 wt % polyurea moieties.

The nature of the binder systems obtained is shown in Table 1 where the thixotropic strength of the system is assessed on a scale of from 0 to 5.

TABLE 1

| Ex | Parts Des | Parts Morph | Parts EDA | *Ratio Morph/ EDA | Thixo- tropic Rating | Appear- ance |
|---|---|---|---|---|---|---|
| A | 17.5 | 6.8 | — | 100:0 | 0 | Clear Soln |
| 3 | 17.8 | 6.3 | 0.3 | 90:10 | 1 | Clear Soln |
| 4 | 18.4 | 5.4 | 0.6 | 75:25 | 3 | Clear gel |
| 5 | 19.5 | 3.8 | 1.3 | 50:50 | 4 | Clear gel |
| 6 | 20.6 | 2.0 | 2.1 | 25:75 | 5 | Clear gel |
| B | 21.9 | — | 3.0 | 0:100 | ** | Marco- molecule |

Des—"Desmodur" N3300
Morph—morpholine
EDA—ethylene diamine
Soln—solution
**—chemically crosslinked intractible solid
*This ratio is the ratio of the number of amino groups provided by the morpholine to the number provided by the diamine.

Table 1 shows that increasing the amount of diamine increases the thixotropic strength. No examination for solid particles could be performed in the case of Example B, but in all other Examples an examination according to ASTM Test D 1210-79 found no particles.

The binder systems of Examples 3 to 6 could be dissolved by aqueous sodium hydroxide and dispersed in water to produce a thixotropic aqueous coating composition which had a good sag resistance when applied to a vertical surface.

COMPARATIVE EXAMPLES C AND D

Systems made using Only One Amino Compound and and Isocyanate Compound containing Three Isocyanate Groups A solution containing autoxidisable film-forming carboxylic acid copolymer was made according to the procedure of Examples 3 to 6 and the mixture was divided into two portions.

Polyurea moieties were made from "Desmodur" N 3300 trimer but only one amine was used with each of the two portions. For Example C, the amine was a monoamine, namely benzylamine and for Example D it was a diamine, namely hexamethylene diamine. In both cases the isocyanate to amino moiety ratio was 1:1 and sufficient reactants were used to produce a system containing 12 wt % (by weight of the non-volatile content of the system) of polyurea moieties. It was found that the system of Example C made using a monoamine alone was clear and free of particles but had virtually no thixotropic structure. In contrast the system obtained from Example D using a polyamine alone produced an excessively chemically crosslinked solid which was too intractable for use as a thixotrope.

COMPARATIVE EXAMPLE E

Binder System made using a Non-acidic Copolymer

A film-forming copolymer was made according to the general procedure of Example 1 except that the comonomers used were 50 parts methyl methacrylate and 50 parts ethyl acrylate. The copolymer had no acid value. Polyurea moieties were made in the presence of the reaction mixture obtained above according to the procedure of Example 1. A system was obtained which was an opaque paste of particles of polyurea having a particle size much greater than 10 nm as defined by the procedure of ASTM Test D 1210-79.

COMPARATIVE EXAMPLE F

Binder System made using a Non-Acidic Copolymer containing Hydroxyl Groups

A non-acidic hydroxyl-containing copolymer was made by copolymerising together 25 parts styrene, 25 parts butyl methacrylate, 25 parts ethyl hexyl acrylate and 30 parts hydroxyethyl acrylate in butyl acetate using butyl peroxy 2-ethyl hexanoate as the initiator. The copolymer obtained had a hydroxy content equivalent to 129 mg KOH/g copolymer but no acid value.

Polyurea moieties were made in the presence of the copolymer by reacting together "Desmodur" N 3300 and either benzylamine or ethylene diamine in amounts such that the ratio of isocyanate moieties to amino moieties was 1:1 and the system contained 6 wt % of polyurea (based on the weight of the non-volatile content of the system). In both cases the polyurea moieties were present as particles having a particle size much greater than 10 nm as defined by the procedure of ASTM Test D 1210-79.

Comparative Example F shows that non-acidic hydroxyl groups in the absence of carboxylic acid groups are insufficient for the avoidance of particles and indicates the need for the copolymer to contain carboxylic acid groups which it is believed catalyse the reaction of isocyanate with the copolymer.

EXAMPLES 7 TO 10

Importance of Temperature during Formation of Polyurea Moieties from unneutralised Copolymers An autoxidisable film-forming carboxylic acid copolymer was made according to the procedure of Examples 3 to 6 and then converted to a binder system using the general procedure of Example 1 but performed at different temperatures as shown in Table 2. The reactants used were "Desmodur" N 3300, 74 parts: morpholine, 16.4 parts and ethylene diamine, 5.7 parts.

In all cases the film-forming thixotropic binder system obtained was a clear gel free from any evidence of particles on examination according to the procedure of ASTM Test D 1210-79. However Table 1 shows that thixotropic strength after 1 day for this particular system (assessed on the 0 to 5 scale used for Examples 3 to 6) decreases as temperature increases.

TABLE 2

| Example | Temperature °C. | Thixotropic Strength |
|---|---|---|
| 7 | 30 | 5 |
| 8 | 40 | 5 |
| 9 | 50 | 4 |
| 10 | 60 | 1 |

EXAMPLES 11 TO 14

Use of a Partially Neutralised Carboxylic Acid Copolymer to extend the Temperature Range over which the Binder System can be made A film-forming carboxylic acid copolymer was made using the procedure of Example 1 except that the amounts of the comonomers were 30.2 parts acrylic acid, 34.9 parts methyl methacrylate and 34.9 ethyl acrylate. The copolymer was made autoxidisable by condensing it with 2.5 moles/kg copolymer of allyl glycidyl ether using the procedure of Examples 3 to 6 thereby producing a solution containing 65.5 wt % of autoxidisable copolymer in MHP. The autoxidisable copolymer had an acid value of 32.8 mg KOH/g copolymer. 1000 parts of the solution were mixed with various first amounts (as specified in Table 3) of a 10 wt % solution of sodium hydroxide in water so as to neutralise the copolymer to extents also as specified in Table 3. To convert the mixture to a thixotropic binder system it was heated to a co-reaction temperature of 90° C. and then 5.11 parts of ethanolamine were added followed by 2.71 parts of ethylene diamine. The temperature was maintained at 90° C. and after 10 minutes, 78.4 parts of "Desmodur" N 3300 were added dropwise over a period of 10 minutes and then the mixture was allowed to stand for a further 20 minutes. A second amount (as specified in Table 3) of the sodium hydroxide solution was added to the mixture and then the mixture was allowed to cool to room temperature. The cooled mixture was allowed to stand for one day so producing a film-forming thixotropic binder system having a thixotropic gel strength as shown in Table 3. The binder systems all contained 6 wt % of polyurea moieties and an isocyanate/amine ratio of 1.14:1.

TABLE 3

| Eg. | 1st Amount NaOH Soln | % Neutralisation | 2nd Amount NaOH Soln | Gel Strength g. cm |
|---|---|---|---|---|
| 11 | 38.3 | 25 | 114.9 | 48 |
| 12 | 76.6 | 50 | 76.6 | 45 |
| 13 | 114.9 | 75 | 38.3 | 47 |
| 14 | 137.9 | 90 | 15.3 | 45 |

Examination of the product according to ASTM Test D 1210-79 found no particles.

Examples 11 to 14 show that use of a carboxylic acid copolymer which has been partially neutralised before co-reaction permits the film-forming thixotropic binder system to be formed at 90° C.

EXAMPLE 15

Use of Lower Temperature and Neutralisation

Example 12 (50% neutralisation) was repeated except that a co-reaction temperature of only 50° C. was used instead of 90° C. and the amounts of reactants were as follows:

| Reactant | Parts |
|---|---|
| 1st Amount NaOH solution | 76.6 |
| Ethanolamine | 8.85 |
| Ethylene diamine | 4.72 |
| "Desmodur" N 3300 | 134.45 |
| 2nd Amount NaOH solution | 76.6 |

The film-forming thixotropic binder system obtained contained 10 wt % polyurea and had an isocyanate/amine ration of 1.14:1. The gel strength of the thixotropic binder system at one day was 95 g.cm. Clearly therefore, lower temperatures favour higher thixotropic structure.

EXAMPLE 16

Preparation of a Paint containing the Lithium Salt of a Binder System according to this Invention A millbase was made by mixing together the following ingredients using a high speed mixer:

| | Ingredient | Parts by weight |
|---|---|---|
| I | Film-forming thixotropic Binder System made according to Example 9 | 56.3 |
| II | Autoxidisable Copolymer made according to the procedure of Examples 3 to 6 | 33.5 |
| III | Rutile Titanium Dioxide Pigment | 92.3 |
| IV | Solution consisting of 10 wt % Lithium hydroxide monohydrate and 90 wt % water | |

29.2 parts of the millbase were taken and mixed in a high speed mixer with a further 82.9 parts of Ingredient II and also 1.7 parts of a solution consisting of 10 wt % cobalt octoate in 90 wt % white spirit. The mixture obtained was diluted with water to give a paint having a Cone and Plate viscosity of 2.5 poise at 25° C.

The paint was applied to a vertical plaster board surface covered with a dried coating of a conventional brilliant white undercoat which was at least 7 days old. The paint was applied at a loading of 75 g/square meter and then allowed to dry at 20° C. and relative humidity 50% for 16 hours. A dried coat was obtained which showed no signs of dripping or sagging.

A 100 micron thick coating of the paint was applied to a horizontal flat gloss plate and allowed to dry for 4 hours at 20° C. and a relative humidity 50%. The dried coating was then found to have a specular gloss of 71% when measured according to ASTM Test D523 using light reflected at an angle of 20° C. to the normal to the surface of the paint. This compares with a gloss of 73% obtained in the absence of the thixotropic binder system as shown in Comparative Example G below. Therefore the thixotropic binder system had only a negligible affect on gloss.

COMPARATIVE EXAMPLE G

Paint not containing any Thixotropic Binder System

Example 11 was repeated except that the thixotropic system (Ingredient I) was omitted and instead the amount of Ingredient II was increased to 89.8 parts. The paint obtained was applied to the vertical wall as in Example 11 and was found to drip and sag badly. The paint was found to have a gloss of 73% when determined as in Example 11.

EXAMPLE 17

Use of an Organic Neutralising Agent.

Example 11 (25% neutralisation and co-reaction temperature 90° C.) was repeated using a 10 wt % solution of dimethylaminoethanol in water as the neutralising agent instead of sodium hydroxide. The amounts of the reactants used were as follows:

| Reactant | Parts |
| --- | --- |
| Autoxidisable copolymer | 717.0 |
| 1st dimethylaminoethanol solution | 61.5 |
| Ethanolamine | 3.85 |
| Ethylene diamine | 1.88 |
| *"Desmodur" N 3300 | 30.9 |
| 2nd dimethylaminoethanol solution | 226.2 |

*Used as a 90 wt % solution of "Desmodur" in a mixture of equal weights of ethyl acetate and toluene.

The film-forming thixotropic binder system obtained contained 6 wt % polyurea and had an isocyanate/amine ratio of 1.14:1. The gel strength after one day was 28 g.cm.

EXAMPLES 18 AND 19

Use of Group 2 Metal Neutralising Agents

The procedure of Example 11 (25% neutralisation) was repeated except that a co-reaction temperature of 50° C. was used instead of 90° C., the neutralising agents were powdered magnesium oxide (Example 18) or powdered calcium oxide (Example 19) instead of aqueous sodium hydroxide and water was added to the mixture of the copolymer solution and the neutralising agent 10 minutes after completion of the addition of the first amount of neutralising agent and before the mixture was heated to 50° C. Water was also added 10 minutes after completion of the addition of the second amount of neutralising agent and before the mixture was allowed to cool. The ingredients used are specified in Table 4 together with the gel strengths obtained after one day. The thixotropic binder systems again contained 6 wt % of polyurea moieties and had an isocyanate/amine ratio of 1.14:1.

TABLE 4

| | Example Parts | |
| --- | --- | --- |
| Ingredients | 18 | 19 |
| Autoxidisable Copolymer Solution | 824.00 | 607.00 |
| First Amount Magnesium Oxide | 2.22 | — |
| First Amount Calcium Oxide | — | 1.64 |
| First Amount Water | 19.97 | 14.73 |
| Ethanolamine | 4.96 | 3.25 |
| Ethylene diamine | 2.40 | 1.83 |
| *"Desmodur" N3300 | 34.24 | 25.94 |
| Second Amount Magnesium Oxide | 5.34 | — |
| Second Amount Calcium Oxide | — | 9.76 |
| Second Amount Water | 48.06 | 87.81 |
| Gell Strength after one day: g. cm | 115 | 145 |

*Used as a 90 wt % solution of "Desmodur" in a mixture of equal weights of ethyl acetate and toluene.

EXAMPLES 20 AND 21

Use of Retarded Thixotropic Development to facilitate Paint Formulation

An aqueous solution of an autoxidisable film-forming carboxylic acid copolymer was made according to the procedure used in Examples 3 to 6.

Millbases were made as follows using various amounts of ingredients as specified in parts by weight in Table 5.

Rutile titanium dioxide was dispersed in a first portion of the above autoxidisable carboxylic acid copolymer solution contained in a cylindrical co-reaction vessel 110 mm high and of diameter 110 mm. A second portion of the copolymer solution was added (followed in the case of Example 3 by a preliminary portion of aqueous sodium hydroxide) and the contents of the vessel were subjected to stirring for 5 minutes at 3000 revolutions per minute.

Ethanolamine was added to the above millbases with gentle stirring (about 100 revolutions/min) followed by ethylene diamine. Gentle stirring was continued for 10 minutes and then replaced by the above high speed stirring. "Desmodur" N3300 solution was added slowly over 10 minutes and the high speed stirring was maintained for a further 20 minutes. Next a cobalt autoxidation catalyst and aqueous sodium hydroxide were added. Finally, the coating composition was thinned with water to a viscosity of 3 poise at 25° C. (as determined using a cone and plate viscometer rotating at 10 000 revolutions/sec) and then stirring was stopped. The millbases and the film-forming thixotropic coating composition had all been made at ambient (18° C.) temperature yet the coating compositions obtained were fluid enough to pour easily from the co-reaction vessel and could be poured into containers. The compositions were free from particles containing polyurea moieties yet developed gel strengths as specified in Table 1 on being allowed to stand undisturbed at 18° C. for one week brimful in a 250 ml container as specified in the Sheen Data Sheet.

Thinned composition which had stood at 18° C. for seven days was spread at 20° C. using a block spreader to give a film coating 100 μm thick. The film showed no tendency to sag and dried within 2 hours to give a gloss of 75% measured using light reflected at 20° to the normal to the surface.

TABLE 5

| | Example | |
| --- | --- | --- |
| Ingredients: Parts by weight | 20 | 21 |
| First Portion: Autoxidisable Copolymer solution | 129.9 | 64.9 |
| Rutile Titanium Dioxide | 123.0 | 61.5 |
| Second Portion: Autoxidisable Copolymer solution | 129.8 | 64.9 |
| Preliminary Portion: *Aqueous Sodium Hydroxide | — | 4.96 |
| Ethanolamine | 0.77 | 0.39 |
| Ethylene diamine | 0.37 | 0.19 |
| "Desmodur" N3300 *solution | 5.54 | 2.77 |
| Cobalt 2-ethyl hexanoate | 3.4 | 1.7 |
| *Aqueous Sodium Hydroxide | 39.75 | 9.94 |
| *Gel Strength g. cm after 1 wk | 45 | 35 |

*Solution consisting of 10 wt % NaOH in water
*Solution consisting of 90 wt % "Desmodur" in a mixture consisting of equal weights of ethyl acetate and aromatic hydrocarbon solvent having a boiling point range of from 157 to 180° at 1 bar.
*Gel strengths measured at 18° C. according to the procedure described in the Sheen Data Sheet headed "REF. 414 Gel Strength Tester" using a 3 × 1 cm paddle. The data sheet is available from Sheen Instruments Limited, 8 Waldegrave Road, Teddington, Middlesex, TW11 8LD, England and the contents of this Data Sheet are herein incorporated by reference.

EXAMPLE 22

Alternative Sequence of Addition of Ingredients when Retarding Thixotropic Development Firstly a solution of an autoxidisable film-forming carboxylic acid copolymer in MHP was made according to the general procedure of Examples 3 to 6 except that esterification was continued slightly longer to produce a partially esterified copolymer having the marginally lower acid value of 32.3 mg KOH/g copolymer. The solution contained 66.5 wt % of the partially esterified copolymer.

Next a millbase was made by adding the following ingredients to a high speed mixer:

| Ingredient | Weight |
| --- | --- |
| Partially esterified copolymer solution as described above | 178 g |
| Solution consisting of 90 wt % water and 10 wt % sodium hydroxide | 27 g |
| Commercial Pigment Grade Rutile Titanium Dioxide | 503 g |
| Water | 27 g |

Stirring was continued for 20 minutes to produce a homogenous slurry.

A gloss paint formulation was then made by adding 722 g of the above partially esterified copolymer solution to a 2.5 liter cylindrical co-reaction vessel which was 110 mm both in height and diameter. A rectangular stirrer paddle 100 mm long by 11 mm wide by 2 mm thick was immersed in the copolymer solution and rotated at 250 revolutions per minute. Stirring at this speed was then continued until just before the final paint formulation was poured from the co-reaction vessel.

5.7 g of morpholine was washed into the copolymer solution with 5.6 g MHP followed by 2 g of ethylene diamine washed in with 2 g MHP. Five minutes later, 35.6 g of a mixture 28.5 g "Desmodur" N3300 and 7.1 g MHP was added to the co-reaction vessel over a period of 10 minutes and washed in with 3 g MHP. A period of 20 minutes was allowed for the co-reaction to occur and then 115 g of an aqueous solution consisting of 90 wt % water and 10 wt % sodium hydroxide was added. After a further 5 minutes, 14 g of cobalt 2-ethyl hexanoate autoxidation catalyst was added followed 5 minutes later by 735 g of the freshly stirred millbase. After a further 5 minutes, 1230 g of water were added to bring the viscosity of the final formulation to 3.0 poise at 18° C. (measured as for Example 20).

Stirring was discontinued and the composition was fluid enough to pour easily into cans even though the entire co-reaction and mixing processes had been performed at ambient (18° C.) temperature. The composition was free from particles containing polyurea moieties yet it developed a gel strength of 50 g cm on being allowed to stand undisturbed at 18° C. for one week brimful in a 250 ml container as specified in the Sheen Data Sheet. Gel strength was measured using a 3×1 cm paddle.

The thinned composition which had stood at 18° C. for one week was spread at 20° C. using a block spreader to give a film coating 100 $\mu$m thick. The film showed no tendency to sag and dried within 2 hours to give a gloss of 75% measured using light reflected at 20° to the normal to the surface.

I claim:

1. A film-forming thixotropic binder system suitable for use in making a thixotropic coating composition, the binder system substantially free of sag-controlling solid particles, the binder system comprising a co-reaction product obtained by co-reacting
   a) at least one isocyanate compound comprising an average of at least 2.5 isocyanate groups per isocyanate molecule,
   b) at least one primary or secondary polyamine (i.e. an amine containing at least two amino groups) and
   c) at least one primary or secondary monoamine
   which co-reaction is performed in the presence of from 80 to 99 wt. % of a film-forming copolymer (where the weight percentage is based on the combined weights of the copolymer, the isocyanate compound, the polyamine and any monoamine) and wherein
   d) the film-forming copolymer is a carboxylic acid copolymer obtained by the addition polymerization of carboxylic acid monomers with non-acid monomers which copolymerize prior to the co-reaction of said (a), (b) and (c), where said copolymer comprises carboxylic acid groups in an amount sufficient to give the copolymer an acid value of at least 25 mgKOH/g copolymer and
   e) the ratio of the number of isocyanate groups to all amino groups is greater than 1:1
where said thixotropic coating composition is an ambient dry coating system.

2. A binder system according to claim 1 wherein the isocyanate compound has a molecular weight of at least 400.

3. A binder system according to claim 1 wherein isocyanate compound comprises at least one isocyanurate trimer containing three isocyanate groups and obtained from di-isocyanate containing 3 to 20 carbon atoms.

4. A binder system according to claim 1 wherein from 10 to 90 wt. % of the amine groups are provided by monoamine.

5. A binder system according to claim 1 wherein the ratio of isocyanate groups to amine groups is from 1.05 to 1.25:1.

6. A binder system according to claim 1 wherein the monoamine is a secondary monoamine.

7. A binder system according to claim 1 wherein the co-reaction is performed in the presence of a copolymer containing hydroxyl groups in addition to carboxylic acid groups.

8. A binder system according to claim 7 wherein the hydroxyl groups are introduced into the copolymer by copolymerised hydroxyalkyl esters.

9. A binder system according to claim 7 wherein the hydroxyl groups are introduced into the copolymer by moieties derived from allyl or methallyl glycidyl ether which has condensed with carboxylic acid moieties of the copolymer to produce a partial ester comprising hydroxyl groups and also autoxidisable groups.

10. A binder system as claimed in claim 7 wherein the carboxylic acid copolymer comprises from 2 to 6 wt. % of hydroxyl groups.

11. The salt or partial salt of a binder system according to claim 1.

12. A coating composition comprising water, 0 to 70 wt. % organic cosolvent (based on the weight of water and cosolvent) and a binder system or its salt as claimed in claim 1.

13. A coating composition according to claim 12 which additionally comprises solid ingredients of the type conventionally included in coating compositions and the binder system amounts to 20 to 60 wt. % of the total solids content of the composition.

14. A process for making a coating composition as claimed in claim 13 which comprises the binder system and solid ingredients wherein the process comprises performing the co-reaction whilst the co-reactants are subject to agitation and introducing solid ingredient to the binder system not later than 8 hours from the start of the co-reaction.

15. A process according to claim 14 wherein any neutralisation of the carboxylic acid copolymer component of the binder system is performed after the co-reaction thereby increasing resistance to precipitation of the polyurea.

16. A process for making a binder system as claimed in claim 1 wherein the carboxylic acid copolymer is at least partially neutralised by alkali before the co-reaction is started.

* * * * *